United States Patent
Kepplinger et al.

(10) Patent No.: US 6,858,061 B2
(45) Date of Patent: Feb. 22, 2005

(54) METHOD AND DEVICE FOR PRODUCING PIG IRON OR LIQUID STEEL PRE-PRODUCTS FROM CHARGE MATERIALS CONTAINING IRON ORE

(75) Inventors: Leopold Werner Kepplinger, Leonding (AT); Herbert Mizelli, Micheldorf (AT); Johann Wurm, Bad Zell (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 159 days.

(21) Appl. No.: 10/276,212

(22) PCT Filed: Apr. 20, 2001

(86) PCT No.: PCT/EP01/04543

§ 371 (c)(1),
(2), (4) Date: Nov. 14, 2002

(87) PCT Pub. No.: WO01/88207

PCT Pub. Date: Nov. 22, 2001

(65) Prior Publication Data

US 2004/0216560 A1 Nov. 4, 2004

(30) Foreign Application Priority Data

May 15, 2000 (AT) ........................................ A 839/2000

(51) Int. Cl.⁷ .............................................. C21B 5/06
(52) U.S. Cl. ........................... 75/471; 75/472; 266/160; 266/197
(58) Field of Search ................... 75/471, 472; 266/160, 266/197

(56) References Cited

U.S. PATENT DOCUMENTS

| | | | | |
|---|---|---|---|---|
| 3,884,677 A | | 5/1975 | Wenzel et al. | 75/42 |
| 3,954,444 A | | 5/1976 | Wenzel et al. | 75/42 |
| 4,365,789 A | * | 12/1982 | Scarlett et al. | 266/87 |
| 4,804,408 A | | 2/1989 | Puhringer et al. | 75/38 |
| 4,889,323 A | * | 12/1989 | Pusch et al. | 266/142 |
| 6,126,717 A | | 10/2000 | Gauthier | 75/466 |

FOREIGN PATENT DOCUMENTS

| | | |
|---|---|---|
| AT | 323213 | 6/1975 |
| DE | 3248249 | 8/1984 |
| DE | 4421673 | 1/1995 |
| EP | 0209880 | 1/1987 |
| EP | 0277360 | 8/1988 |
| EP | 0621343 | 10/1994 |
| WO | 97/28284 | 8/1997 |

\* cited by examiner

*Primary Examiner*—Melvyn Andrews
(74) *Attorney, Agent, or Firm*—Ostrolenk, Faber, Gerb & Soffen, LLP

(57) ABSTRACT

The invention relates to a process for producing pig iron or liquid primary steel products in a blast furnace, $CO_2$ being substantially removed from at least a partial stream of a top gas emerging from a reduction shaft furnace (1), and this partial stream if appropriate being heated and being introduced into the blast furnace as reduction gas, and to a plant for carrying out this process, the top gas being introduced into the lower region of the blast-furnace shaft. This measure results in an improved energy balance and improved process management compared to the prior art.

8 Claims, 1 Drawing Sheet

METHOD AND DEVICE FOR PRODUCING PIG IRON OR LIQUID STEEL PRE-PRODUCTS FROM CHARGE MATERIALS CONTAINING IRON ORE

BACKGROUND OF THE INVENTION

The invention relates to a process for producing pig iron or liquid primary steel products in a blast furnace, $CO_2$ being substantially removed from at least a partial stream of a top gas emerging from a reduction shaft furnace, and this partial stream if appropriate being heated and being introduced into the blast furnace as reduction gas, and to a plant for carrying out this process.

A process of this type is known from DE 4421673A1. In this process, the top gas, after $CO_2$ has been removed, is mixed with hot nitrogen or with hot nitrogen-containing and argon-containing gas and is thus heated to over 800° C. In the process, heated top gas from which $CO_2$ has been substantially removed is fed to the blast furnace via a hot-air distribution pipe. The heating of the top gas must be carried out extremely quickly while avoiding reaction of the CO gas in accordance with the Boudouard equilibrium and avoiding reaction of the $H_2$ gas according to the heterogeneous water gas reaction, resulting in a considerable outlay on process and plant technology.

U.S. Pat. No. 3,954,444 A1 relates to a process for the direct reduction of iron ores. In this process, a portion of the reducing gas is removed from a shaft furnace, is treated and is then fed back to the shaft furnace. In this case, in a particular embodiment the reducing gas can also be introduced into a blast furnace as reducing agent. In this process too, the regeneration of the gas is laborious and involves a high outlay on process and plant technology.

With a view to the prior art, it is an object of the invention to develop a process and a plant for carrying out this process which, compared to the prior art, results in an improved energy balance and improved process management.

SUMMARY OF THE INVENTION

The invention concerns reducing iron-oxide containing charge materials in a reduction furnace which produces top gas, substantially removing $CO_2$ from at least a partial stream of the top gas, partially combusting and heating the partial stream of top gas and introducing the heated gas as a reduction gas into the lower region of the shaft of a blast furnace and apparatus which performs the described steps.

The upper truncated cone of a blast furnace, which forms approximately three-fifths of its height, is referred to by the person skilled in the art by the term shaft.

The feature according to the invention of introducing the heated top gas into the lower region of the blast-furnace shaft results in significant advantages in process management compared to the prior art.

The invention provides in particular for the complete re-use of the top gas from the shaft furnace in the process. The top gas from the shaft furnace is supplied for re-use, preferably with a view to utilizing its reducing properties. According to the process according to the invention, a partial stream of this top gas can be introduced into a blast furnace, whereas a further partial stream can be used, for example, for generating energy. It is, however, essential that the top gas be extracted after it has passed through the shaft furnace rather than, for example, as in the prior art, a partial stream being branched off at the shaft furnace. Compared to this prior art, the procedure according to the invention results in far more efficient heating of the burden in the shaft furnace, which represents an important criterion for operation.

According to a particularly preferred embodiment of the invention, the entire top gas from the shaft furnace is introduced into the blast furnace.

Furthermore, the gas supply of this type which, according to the invention, takes place above the belly reduces the thermal load on the belly and the bosh and improves the gas permeability of this region and the drainage of the liquid phase.

The position where the top gas is supplied at the lower region of the blast-furnace shaft is substantially determined by the composition of the top gas of the process in question.

Since each top gas has a particular composition which is generally characteristic of the process from which it is derived, the known framework conditions must be used to determine that point of introduction of the gas at the shaft of the blast furnace which allows the blast furnace to operate at an optimized operation point.

The following statements can be made about the said point at the shaft of the blast furnace at which the top gas is introduced into the blast furnace:

The introduction point is generally situated, in positional terms, above the cohesive zone or above the zone of direct reduction, and therefore at the shaft of the blast furnace. The position where the top gas is introduced to the blast-furnace shaft is determined on the one hand by the temperature and composition of the top gas and on the other hand by the operation of the blast furnace. The crucial factor is the effect which is achieved as a result of the introduction of the top gas.

The effect of the top gas on the charge means of the blast furnace process which is decisive in this respect for matching the composition of the top gas lies on the one hand in the increase in the proportion of indirect reduction by the supply of reduction gas, and in the same way the proportion of direct reduction, which in the blast furnace leads to undesirable carbon consumption and to a high energy consumption on the part of the process, is reduced in the process, and on the other hand in a significantly higher heating rate and therefore less decomposition of ore, which is also associated with a larger reaction volume inside the charging area of the blast furnace.

According to a preferred embodiment of the invention, the temperature of the top gas before it enters the blast furnace is higher than 750° C., preferably between 750° C. and 1100° C., advantageously between 800° C. and 920° C., and particularly advantageously between 820° C. and 880° C., this gas being introduced into the blast furnace at the lower end of the blast-furnace shaft in order to reduce the wustite.

In the process, at the location where the gas is introduced in a conventional blast furnace, which corresponds to the prior art, temperatures of 1100° C. and below, in an advantageous embodiment of less than 1000° C., and in a particularly advantageous embodiment of less than 900° C., are reached in the outer layers of the blast furnace charging area.

According to a particularly advantageous embodiment, the process according to the invention for producing pig iron or liquid primary steel products has a melter gasifier, which converts reduced iron particles into pig iron and, in the process, forms a reduction gas. This reduction gas is particularly suitable for subsequent use in a reduction shaft furnace, and furthermore serves as a basis for the top gas which, for the purposes of the invention, is introduced into the lower region of the blast-furnace shaft.

According to a further feature of the invention, the substantially $CO_2$-free top gas is heated to over 800° C. by partial combustion.

In this way, the partial combustion leads to an adjustment to the $CO_2/H_2O$ contents of the top gas, in order, in this way, to suitably adapt, as described, the composition of the top gas which is to be introduced into the blast furnace and in particular to reduce the deposition of carbon in the blast furnace. Lowering the occurrence of finely distributed carbon of this type has a beneficial effect on the energy balance of the process.

Working on the basis of a top gas composition which is typical for a specific process, not only is the coke consumption reduced as a result of the top gas being introduced into the blast furnace in the lower region of the blast-furnace shaft, but also the degree of oxidation of the top gas introduced is adapted to the particular region of the blast furnace into which the top gas is to be introduced, and in this way operation of the blast furnace unit is optimized.

If the heated top gas has hitherto been introduced into the blast furnace via a conventional hot-air line and therefore inevitably had a particularly low level of $CO_2$ and $H_2O$, then introduction of the gas at a position significantly above the conventional hot-air line on the shaft of the blast furnace means that a higher $CO_2$ and $H_2O$ content is specifically desired.

The measure according to the invention of heating the substantially $CO_2$-free top gas by partial combustion replaces the procedure according the prior art which provided for the top gas to be heated with hot nitrogen or nitrogen-containing and argon-containing gas, resulting in the introduction of a far more expedient form of heating of the top gas. The at least partial reaction of the top gas by partial oxidation results in a significant rise in the temperature of the gas. So although the $CO_2$ and $H_2O$ contents of the top gas are increased again following the upstream $CO_2$ removal which is already known from the prior art, this increase is within the range which is determined by the interaction between gas composition and location where the top gas is introduced at the shaft of the blast furnace. Furthermore, the rise in the $CO_2$ and $H_2O$ contents is sufficiently low for it to be impossible to determine any significant fall in the reduction work compared to the procedure in the closest prior art.

Further advantages of this process are as follows:

The fact that the location where the gas is supplied to the blast furnace is modified compared to the prior art makes it possible to heat the top gas, by the simple means of partial combustion, to the desired temperature, since in principle $CO_2$ and $H_2O$ levels do not have any adverse effect. The laborious method of heating the top gas by mixing with hot gaseous nitrogen or argon, as described in the prior art, is overcome in this way. The increase in the level of indirect reduction in the blast furnace process leads to a significant energy saving, with the result that the blast furnace can be operated at a significantly improved operating point with regard to the energy and gas balance.

According to a further feature according to the invention, the top gas from which $CO_2$ has been removed, in addition to being partially burnt, is recuperatively and/or regeneratively preheated.

In this case, the recuperative and/or regenerative heating and the partial combustion are adapted to one another and to the overall process, thus enabling the $CO_2/H_2O$ content to be set particularly efficiently and easily.

Once the location where the reducing gas is to be introduced into the blast furnace has been determined, the $CO_2/H_2O$ contents of the reducing gas are set by a controlled change in the parameters of the $CO_2$ removal and/or the preheating and/or the partial oxidation in a suitable manner for operation of blast furnace.

Two-stage heating of the top gas, comprising recuperative and/or regenerative preheating and subsequent partial combustion, prevents the occurrence of metal dusting and an excessive deposition of carbon in the blast furnace.

According to a particularly preferred embodiment of the invention, the top gas from which $CO_2$ and $H_2O$ has been removed, prior to its partial combustion, is recuperatively or regeneratively preheated to a temperature range between 300 and 600° C., preferably between 400 and 500° C.

This measure allows a particularly expedient configuration of the process which is distinguished in particular by the particularly advantageous adaptation of the preheating with respect to the partial combustion. The recuperative and/or regenerative nature of the preheating means that the $CO_2/H_2O$ contents of the top gas are scarcely or only minimally increased, which may prove advantageous as the process continues.

BRIEF DESCRIPTION OF THE DRAWING

A non-restricting exemplary embodiment of the invention is explained in more detail below with reference to a diagrammatic drawing, in which.

DESCRIPTION OF A PREFERRED EMBODIMENT

Figure 1:
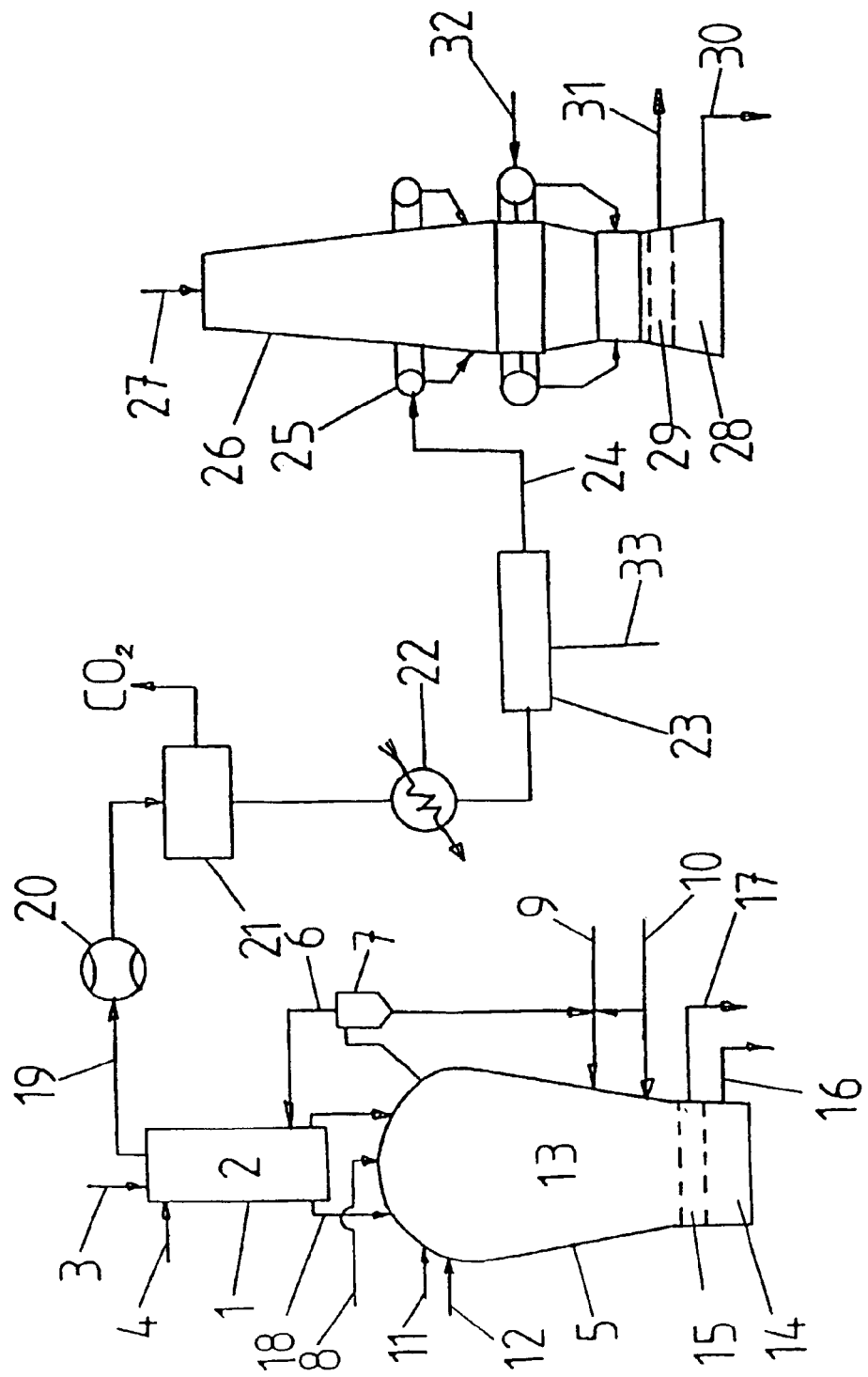
FIG. 1 diagrammatically depicts a plant according to the invention and a diagrammatic process sequence for the production of pig iron or liquid primary steel products form iron-ore-containing charge materials.

A direct reduction device, which is designed as a reduction shaft furnace, is denoted by 1; its reduction zone 2 is charged from above, via a feedline 3, with lumpy iron-oxide-containing charge materials, if appropriate together with unburnt additions introduced via a feedline 4. The shaft furnace 1 is connected to a melter gasifier 5, in which a reduction gas is produced from carbon carriers and oxygen-containing gas, which reduction gas is fed to the shaft furnace 1 via a feedline 6, a gas-cleaning and/or gas-cooling device 7 being provided in the feedline 6.

The melter gasifier 5 has a feed 8 for solid, lumpy carbon carriers, a feedline 9 for returning dust, and a feedline 10 for oxygen-containing gases and feed-lines 11, 12 for carbon carriers which are liquid or gaseous at room temperature, such as hydrocarbons, and for burnt additions. In the melter gasifier 5, molten pig iron 14 and molten slag 15 collect beneath the melting/gasification zone 13 and are tapped off via taps 16, 17.

The lumpy ore, which has been reduced to form iron sponge in the shaft furnace 1 in the reduction zone 2, is transferred, together with the additions which have been burnt in the reduction zone 2, via lines 18 which connect the shaft furnace 1 to the melter gasifier 5, into the melter gasifier, for example by means of discharge worms (not shown).

The upper part of the shaft furnace 1 is adjoined by a top-gas outlet line 19 for the top gas which forms in the reduction zone 2. This top gas, which is at a temperature of approximately 200–400° C., is fed to a $CO_2$ scrubber 21 via a gas-cleaning device 20, and on entering this scrubber is approximately at ambient temperature. The chemical composition of the top gas is substantially as follows:

|  | $CO_2$ | CO | $H_2$ | $N_2$ + remainder |
| --- | --- | --- | --- | --- |
| % by vol. | 35 | 40 | 20 | 5 |

Once it has emerged from the $CO_2$ scrubber, the now substantially $CO_2$-free top gas has substantially the following chemical composition:

|  | $CO_2$ | CO | $H_2$ | $N_2$ + remainder |
| --- | --- | --- | --- | --- |
| % by vol. | 2 | 60 | 30 | 8 |

Furthermore, the top gas is fed to a recuperator or regenerator 22, in which it is heated to a temperature of approximately 450° C. Then, the cleaned, substantially $CO_2$-free top gas passes into a reactor 23, in which it is partially burnt when oxygen-containing medium, in particular pure oxygen, is supplied through a line 33. In the process, the gas reaches a temperature of approximately 850° C. The partially burnt gas has substantially the following composition:

|  | $CO_2$ | CO | $H_2$ | $N_2$ + remainder |
| --- | --- | --- | --- | --- |
| % by vol. | 5 | 58 | 29 | 8 |

The heated top gas is then fed via a line 24 to a ring pipeline 25 of a blast furnace 26 and is introduced into the blast furnace in the lower region of the blast-furnace shaft. Iron oxides together with coke and additions are fed to the blast furnace, which may be of any conventional design, from above via a feedline 27. Molten pig iron 28 and molten slag 29 are discharged in the customary way via taps 30, 31. Hot air is supplied via the hot-air feedline 32.

According to the invention, a process of this type and a plant of this type result in the following advantages:
Particularly efficient expansion of the iron production capacity in an existing blast furnace by the direct reduction process, since the top gas from the direct reduction process is advantageously used in the blast furnace, and in this way the top gas produced during the direct reduction process is utilized for the additional production of pig iron in existing blast furnaces.
Increase in capacity of the blast furnace as a result of an increase in the degree of reduction via indirect gas reduction of the burden and therefore improvement of the heat balance in the bosh and hearth of the blast furnace.
More efficient calcination of lump additions if they are used directly in the blast furnace.

What is claimed is:

1. A process for producing pig iron or liquid primary steel products in a blast furnace, the process comprising:
   reducing iron-oxide containing charge materials in a reduction shaft furnace which produces top gas including $CO_2$;
   substantially removing the $CO_2$ from at least a partial stream of top gas emerging from the reduction shaft furnace;
   heating the partial stream of top gas from which the $CO_2$ had been substantially removed, the heating being by partial combustion of the top gas; and
   then introducing the heated partial stream as a reduction gas, into a lower region of a shaft of a blast furnace.

2. The process of claim 1, further comprising:
   reducing a portion of iron ore containing charge materials in the reduction shaft furnace by use of a reduction gas;
   melting the reduced iron particles obtained in a melter gasifier along with coal and oxygen containing gas for producing the reduction gas, and at the same time the reduction gas is formed feeding the gas to a reduction zone of the reduction shaft furnace.

3. The process of claim 1, wherein the top gas with $CO_2$ removed is heated to above 750° C. by partial combustion.

4. The process of claim 3, wherein prior to the partial combustion, the top gas from which the $CO_2$ has been substantially removed is at least one of recuperatively and regeneratively preheated to at least between 300° C. and 600° C.

5. A plant for producing pig iron or liquid primary steel products in a blast furnace, the plant comprising:
   a blast furnace for producing pig iron or liquid primary steel products, the blast furnace having a lower region and a blast furnace shaft in the lower region;
   a reduction shaft furnace for reducing lumpy iron ore and also producing a top gas during the reduction, the reduction shaft furnace having an outlet line for the reduction product and having a top gas outlet line;
   a $CO_2$ removal device connected with the top gas outlet line for receiving top gas from the top gas outlet line and removing $CO_2$ therefrom;
   at least one introduction line for introducing warm top gas which is substantially free of $CO_2$ into the shaft in the lower region of the blast furnace; and
   a reactor connected by lines to the $CO_2$ removal device and to the blast furnace shaft for partially combusting the top gas before the top gas is introduced to the blast furnace shaft.

6. The plant according to claim 5, wherein the reduction shaft furnace has a feed line for reduction gas;
   a melter gasifier in the feed line for reduction gas;
   a line for carrying the reduction product out of the reduction shaft furnace, and opening into the melter gasifier;
   feed lines to the melter gasifier for oxygen containing gases;
   an outlet line from the reduction shaft furnace for transmitting the reduction gas which is formed.

7. A plant according to claim 6, wherein the feed lines are for at least one of oxygen containing gases appropriate dust and carbon carriers.

8. A plant according to claim 5, further comprising at least one line for feeding oxygen containing medium for partial combustion of the top gas; and
   a heating reactor for receiving the oxygen containing medium and for the partial combustion in the reactor of the top gas.

* * * * *